United States Patent
Cho

(10) Patent No.: US 6,841,975 B2
(45) Date of Patent: Jan. 11, 2005

(54) VOLTAGE REGULATOR HAVING INSERT SLOTS

(76) Inventor: Albert Cho, 6Fl., No.41, Lane 221, Gangchi Rd., Neihu Chiu, Taipei (TW)

( * ) Notice: Subject to any disclaimer, the term of this patent is extended or adjusted under 35 U.S.C. 154(b) by 64 days.

(21) Appl. No.: 10/429,888

(22) Filed: May 6, 2003

(65) Prior Publication Data
US 2004/0222777 A1 Nov. 11, 2004

(51) Int. Cl.⁷ ............................................... H02M 1/00
(52) U.S. Cl. ....................................... 323/146; 323/359
(58) Field of Search ............................... 323/305, 355, 323/359; 363/146

(56) References Cited

U.S. PATENT DOCUMENTS 5,563,782 A * 10/1996 Chen et al. ................. 363/146
5,789,907 A * 8/1998 Casagrande ................ 323/335
6,304,476 B1 * 10/2001 Liao ........................... 363/146
6,362,987 B1 * 3/2002 Yurek et al. ................ 363/146

* cited by examiner

Primary Examiner—Jeffrey Sterrett
(74) Attorney, Agent, or Firm—Birch, Stewart, Kolasch & Birch, LLP

(57) ABSTRACT

A voltage regulator having insert slots adopted for used on extension lines to stabilize electric current comprises a body which has an upper shell and a lower shell. The body is divided in a socket zone and a voltage stabilizing zone which houses an annular transformer. The voltage stabilizing zone is directly connected to input current. The annular voltage transformer can rapidly adjusts and achieves stable voltage according to voltage fluctuations of input current and different loading properties of the socket zone, and the annular voltage transformer is formed in a small size and a light weight to allow the voltage regulator to be made in slim and light.

8 Claims, 4 Drawing Sheets

VOLTAGE REGULATOR HAVING INSERT SLOTS

FIELD OF THE INVENTION

The present invention relates to a voltage regulator that has insert slots and particularly to a small size and light weight current stabilizing apparatus adopted for use on extension lines.

BACKGROUND OF THE INVENTION

The commonly used household electric appliances often occur malfunction due to unstable DC power. Some areas have great voltage fluctuations that even cause damages of the electric appliances and result in huge losses to users. It is widely recognized that stability of electricity is important. Hence many venders have developed voltage regulators to stabilize electric power supply. The voltage regulators often are formed in an independent structure which contains an iron core transformer to connect to a circuit. They usually are separately installed on the electric appliances or extension lines or sockets. Operation is quite troublesome. Moreover, conventional iron core transformers generally have a bulky size and take a large space. It is against the prevailing trend that focuses slim and light. In addition, the conventional voltage regulators tend to overheat after having operated under full load for a long period of time. This impacts the service life of the voltage regulator, or indirectly affects normal operation for a given load.

Thus to resolve the problem of bulky conventional voltage regulators caused by the iron core transformers and develop slim and light voltage regulators to increase convenience of product utilization are an important issue remained to be overcome.

SUMMARY OF THE INVENTION

Therefore the primary object of the invention is to resolve the aforesaid disadvantages and eliminate the drawbacks mentioned above. The invention provides an approach that combines an extension line and a voltage regulator to overcome the shortcoming of bulky product size caused by the conventional iron core transformer. The invention employs an annular transformer that shrinks the total structure size to facilitate carrying without taking too much of space.

In order to achieve the foregoing object, the voltage regulator according to the invention that is adopted for use on extension lines includes a body consisting of an upper shell and a lower shell. The body has a socket zone consisting of insert slots and a voltage stabilizing zone housing an annular transformer. The voltage stabilizing zone is directly connected to input current. Through the annular transformer, stable voltage can be rapidly adjusted and achieved according to voltage fluctuations of input current and different loading properties on the socket zone. The annular transformer may be made in a small size and light weight. Thus the voltage regulator also becomes slim and light.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENT

Figure 1:
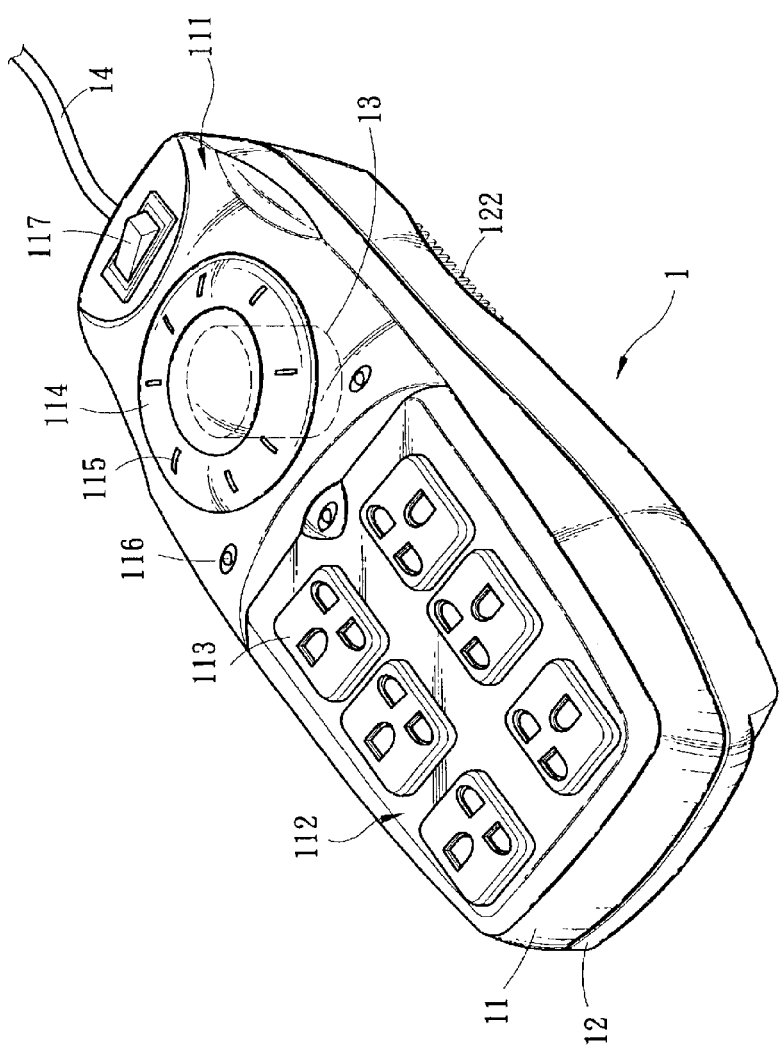
FIG. 1 is a perspective view of the present invention.
Figure 2:
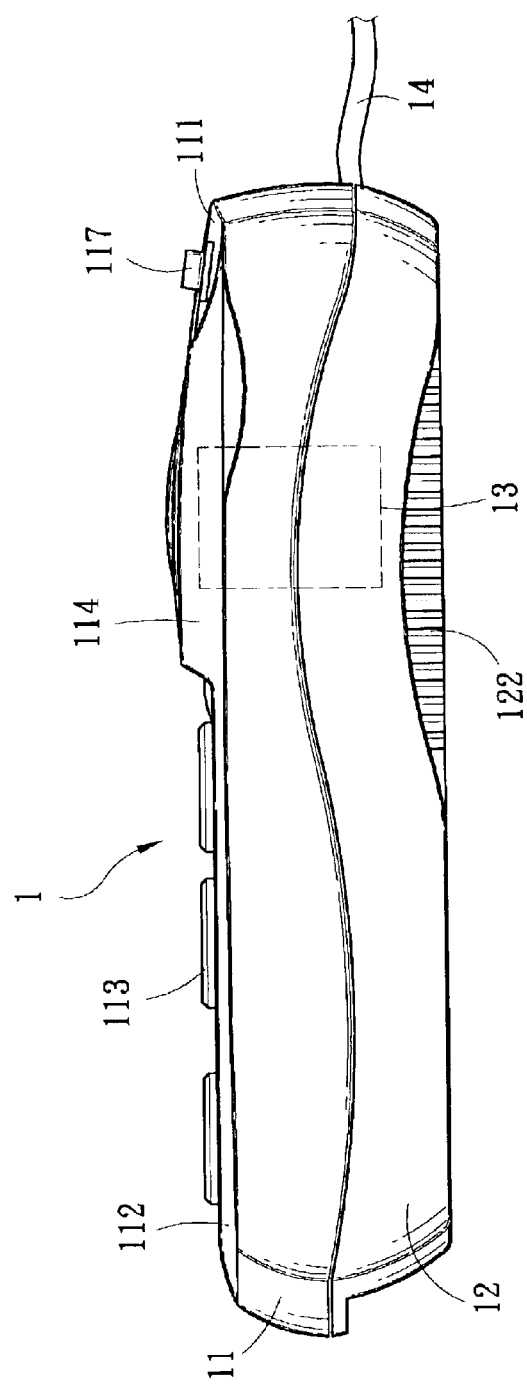
FIG. 2 is a side view of the present invention.

Please refer to FIGS. 1 and 2, the voltage regulator that has insert slots according to the invention is adopted for use on extension lines to stabilize electric current. It includes a body 1 which consists of an upper shell 11 and a lower shell 12. The body 1 has a socket zone 112 and a voltage stabilizing zone 111. The voltage stabilizing zone 111 can rapidly adjust and achieve stable voltage according to voltage fluctuations of input current and different loading properties of the socket zone 112.

The body 1 has two sides formed in arched and streamline profiles.

The voltage stabilizing zone 111 is directly connected to a power supply through a conductive wire 14, and has an annular bulged section 114 which has radial radiation holes 115. On one side of the voltage stabilizing zone 111 adjacent to the annular bulged section 114, there is a luminescent switch 117. On other side of the voltage stabilizing zone 111 adjacent to the annular bulged section 114, there is an indication light 116. In the voltage stabilizing zone 111 corresponding to the annular bulged section 114 there is an annular transformer 13 sandwiched between the upper shell 11 and the lower shell 12.

The socket zone 112 has insert slots 113 which conform to industrial specifications.

By means of the construction set form above, the extension line and the voltage regulator may be coupled and integrated to become one element. It resolves the problem of bulky size occurred to the conventional products resulting from too large iron core transformer. The voltage regulator thus made is slim and light, and is convenient to carry without taking too much space.

Figure 3:
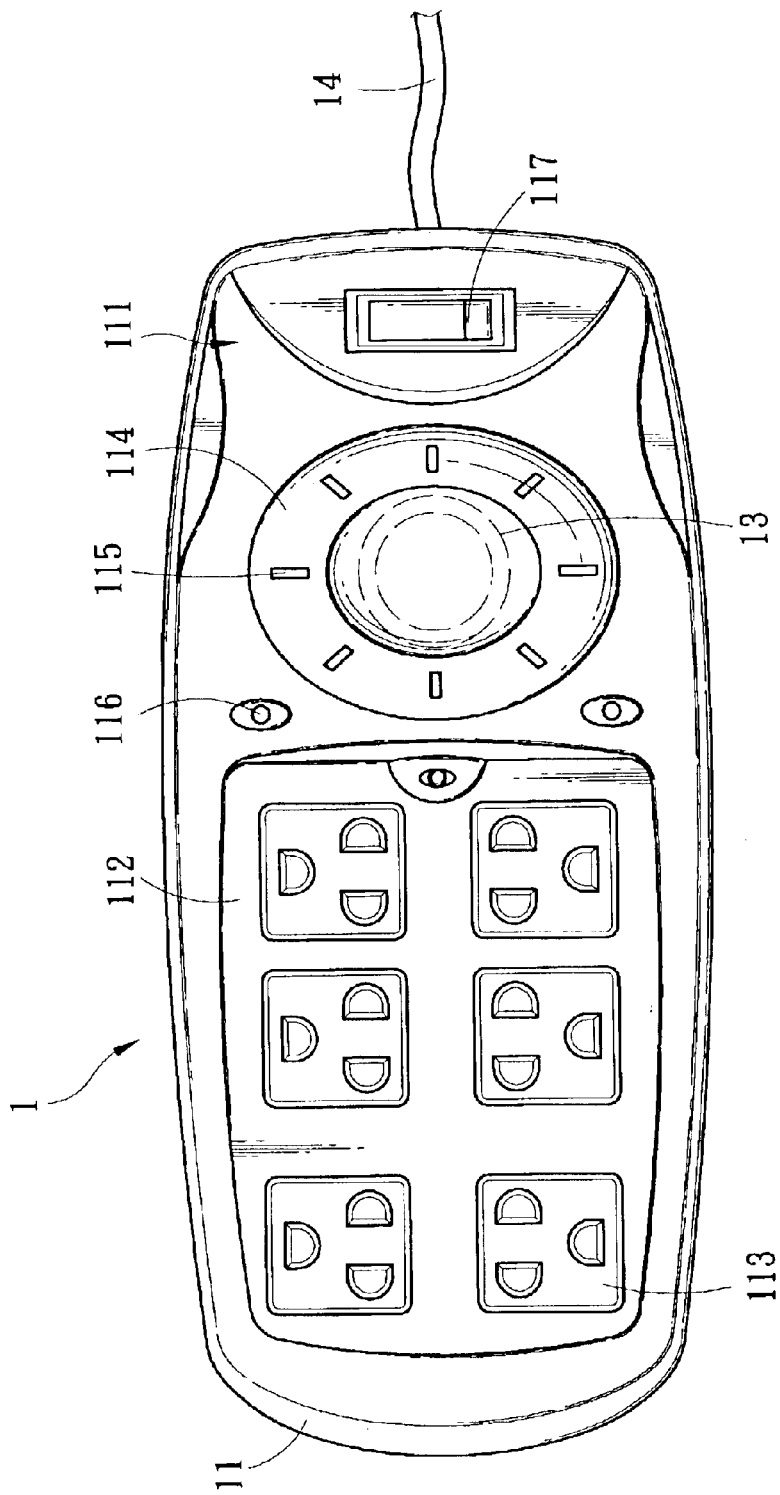
FIG. 3 is a front view of the present invention.

Referring to FIG. 3, the annular transformer 13 of the invention is designed to enable the voltage regulator to achieve stable and safe operation. It also is more durable and easier to use. In order to enable the electric products that employ the invention to achieve a normal service life, the annular bulged section 114 has radiation hole 114 corresponding to the annular transformer 13 so that when the invention is operated under a full load condition for a long period of time, it is not overheated. In addition, in the event that any one of the phase lines of the external power supply breaks, the invention immediately stops power supply, and the indication light 116 is ON to provide an alarm signal. Thereby safer use of the electric products can be assured and damage of the electric products may be prevented.

Figure 4:
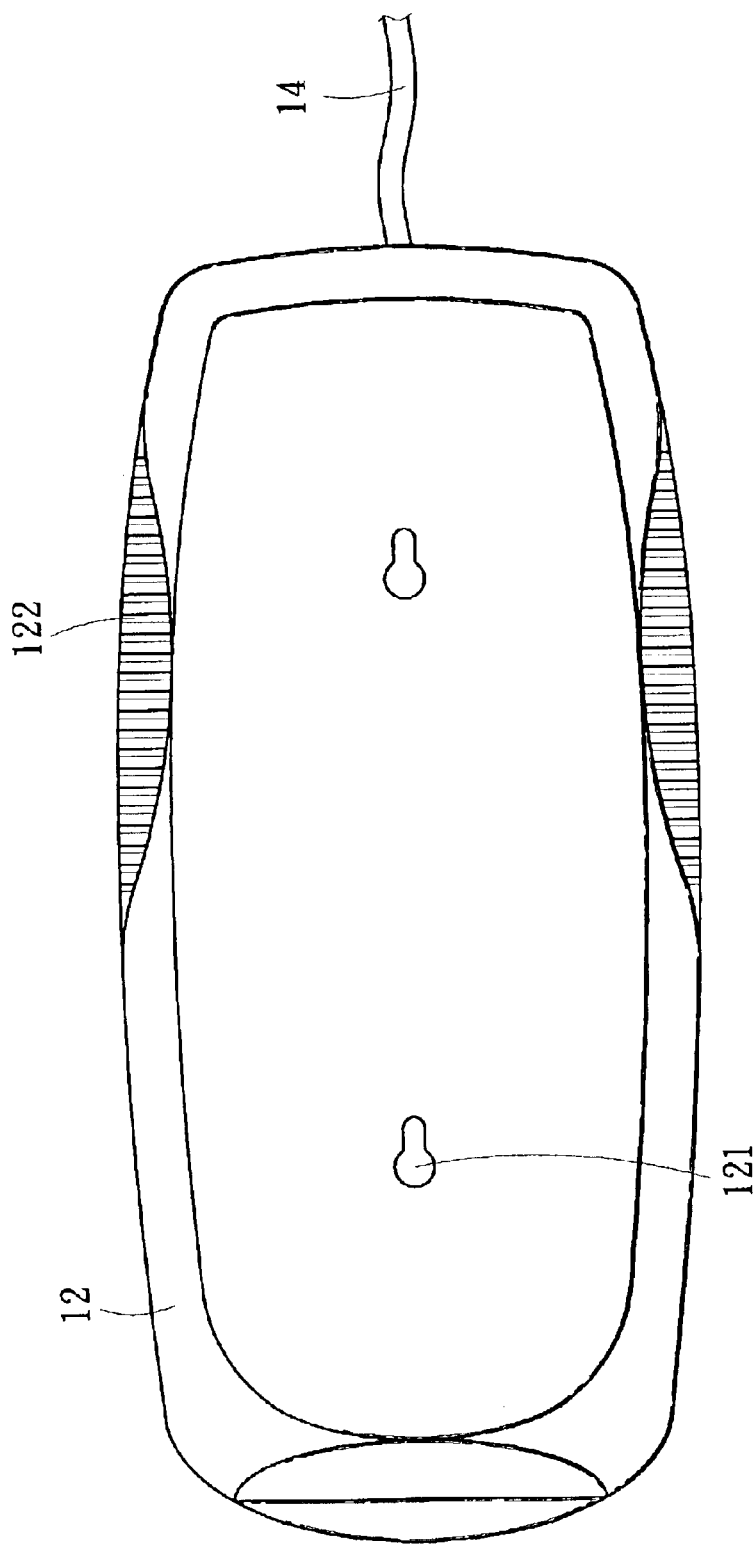
FIG. 4 is a rear view of the present invention.

Referring to FIG. 4, the bottom side of the lower shell 12 has at least one hole 121 for hanging on a wall as desired to achieve a secured installation and save space according to different requirements. On two sides of the lower shell 12, there are anti-slip sections 122 to allow the body 1 to be laid and anchored securely on the use location.

Furthermore, the body 1 may be made in the form of arch-shape, ellipsoidal cylinder, circular-shape, polygonal-shape or the like. The profiles of the socket zone 112 and voltage stabilizing zone 111 may mate each other depending on the structure of the body 1. The radiation holes 115 of the annular bulged section 114 may be formed in radial shape, vertical manner, arched shape, or the like to achieve optimal aesthetic effect.

What is claimed is:

1. A voltage regulator having insert slots adopted for used on extension lines to stable electric current, comprising:

a body having a socket zone and a voltage stabilizing zone; and an annular voltage transformer located in the voltage stabilizing zone;

wherein the annular voltage transformer rapidly adjusts and achieves stable voltage according to voltage fluctuations of input current and different loading properties on the socket zone.

2. The voltage regulator of claim 1, wherein the body consists of an upper shell and a lower shell.

3. The voltage regulator of claim 2, wherein the lower shell has two sides forming respectively an anti-slip section.

4. The voltage regulator of claim 2, wherein the lower shell has a bottom side which has at least one hole.

5. The voltage regulator of claim 1, wherein the voltage stabilizing zone directly connects to a power supply through a conductive wire.

6. The voltage regulator of claim 1, wherein the voltage stabilizing zone has an annular bulged section which has radial radiation holes, a switch adjacent to one side of the annular bulged section, and an indication light adjacent to other side of the annular bulged section.

7. The voltage regulator of claim 1, wherein the annular transformer is located below the annular bulged section.

8. The voltage regulator of claim 1, wherein the socket zone has insert slots conforming to industrial specifications.

* * * * *